United States Patent [19]

Tsen

[11] Patent Number: 4,971,812

[45] Date of Patent: Nov. 20, 1990

[54] IMMOBILIZED *PENICILLIUM* SP. *NARINGNASE* AND ITS USE IN REMOVING NARINGIN AND LIMONIN FROM FRUIT JUICE

[75] Inventor: Hau-Yang Tsen, Taichung, Taiwan

[73] Assignee: National Science Council, Taipei, Taiwan

[21] Appl. No.: 401,611

[22] Filed: Aug. 31, 1989

[51] Int. Cl.$^5$ ................................................. A23L 2/34
[52] U.S. Cl. ........................................ 426/51; 426/52
[58] Field of Search ................... 426/51, 52, 599, 491, 426/495

[56] References Cited

U.S. PATENT DOCUMENTS 3,911,103  10/1975  Hasegawa et al. .................. 426/51
3,920,851  11/1975  Hasegawa et al. .................. 426/51

FOREIGN PATENT DOCUMENTS 2249625  5/1975  France .................................. 426/51

OTHER PUBLICATIONS

Jimeno et al., "Use of Naringinase Immobilized on Glycophase-Coated Porous Glass for Fruit Juice Debittering", Process Biochemistry, (1972), pp. 7, 9-12.
*Methods in Enzymology*, XLIV, (1976), pp. 232-235.

*Primary Examiner*—Marianne Cintins
*Attorney, Agent, or Firm*—Cushman, Darby & Cushman

[57] ABSTRACT

*Penicillium* sp. *naringinase* immobilized in cellulose triacetate is useful in simultaneous removal of naringin and limonin from fruit juices.

6 Claims, 6 Drawing Sheets

IMMOBILIZED *PENICILLIUM* SP. *NARINGNASE* AND ITS USE IN REMOVING NARINGIN AND LIMONIN FROM FRUIT JUICE

FIELD OF THE INVENTION

The present invention relates to an immobilized *Penicillium* sp. *naringinase* and its use for simultaneous removal of naringin and limonin from fruit juices.

BACKGROUND OF THE INVENTION

The processing of citrus fruits such as grapefruit and Natsudaidai fruit to yield fruit juices is complicated by several factors which affect the bitternesses of final products. It would be advantageous for processors to simultaneously remove two or more bitternesses from fruit juices.

In recent years, the art of immobilized enzymes has been developed to facilitate extremely efficient and economic enzyme use and permit the design of continuous enzymatic processes for fruit juice debittering.

In some juices, naringin, a main bitter component of several citrus juices, is present in excess of 700-800 ppm amounts definitely shown to be responsible for making the juice too bitter. Naringin can be hydrolyzed by naringinase which is an enzyme mixture containing $\alpha$-rhamnosidase and $\beta$-glucosidase, in which naringin is hydorlyzed by the $\alpha$-rhamnosidase to rhamnose and prunin and then by the $\beta$-glucosidase to glucose and naringenin. Since prunin bitterness is less than one third that of naringin, only the first hydrolyzing activity, i.e. the $\alpha$-rhamnosidase activity, is essential for debittering of citrus juices such as grapefruit juices and Natsudaidai juices.

In order to control the naringin contents in citrus juices, Aspergillus niger naringinase which contains both $\alpha$-rhamnosidase and $\beta$-glucosidase activities has been immobilized on various insoluble carriers, such as copolymers of maleic anhydride with styrene, hollow fiber, porous glass beads, DEAD-Sephadex A25, chitin and tanninaminohexyl cellulose; see, e.g., Int. J. Biochem., 2, 448-456 (1971), J. Food Sci., 44, 1358-1361 (1979), J. Ferment. Technol., 57, 310-316 (1979), J. Ferment. Technol., 55, 493-500 (1977), Nat. Sci. Council. Monthly R.O.C., 9, 871-881 (1981), J. Ferment. Technol., 62, 263-267 (1981) and Agric. Biol. Chem., 42, 1849-1853 (1978).

However, these immobilized enzymes are not suitable for use in the continuous processes for debittering fruit juices due to poor operational stabilities.

It is disclosed by Jimeno A. et al. in Process Biochem., 22, 13-16 (1987) that *Penicillium* sp. *naringinase* immobilized on glycophase-coated porous glass is used for natural grapefrurt juice debittering. However, the column reactors made of these immobilized enzymes have column blocking or filtering action when natural fruit juice is continuously passed through it. Therefore, juice clarification by pectinase treatment or centrifugation is required before the juice debittering.

It is known from Process Biochem., 7, 9-12 (1972) and Methods in Enzymology, 44, 227-243 (1976) that column blocking or filtering action of catalyst bed can be avoided when the enzyme is entrapped in cellulose triacetate.

Moreover, cellulose mono-acetate gel bead column is disclosed in J. Sci. Food Agric. 1981, 32, 1183-1190 for the removal of the bitter limonin only from citrus juices.

It is accordingly an object of the present invention to demonstrate that *Penicillium* sp. *naringinase* immobilized on cellulose triacetate can simultaneously remove naringin and limonin from fruit juices, especially citrus juices.

A further object of the present invention is to provide a process for simultaneous removal of naringin and limonin from fruit juices.

Another object of the present invention is to provide higher operational stability for successively debittering fruit juices for a long time.

These and other objects will readily become apparent to those skilled in the art in the light of the teaching herein set forth.

SUMMARY OF THE INVENTION

According to the present invention *Penicillium* sp. *naringinase* immobilized on cellulose triacetate is provided to simultaneously remove naringin and limonin from fruit juices, especially citrus juices.

A further aspect of the present invention is a process for simultaneous removal of naringin and limonin from fruit juices.

DETAILED DESCRIPTION OF THE INVENTION

Figure 1:
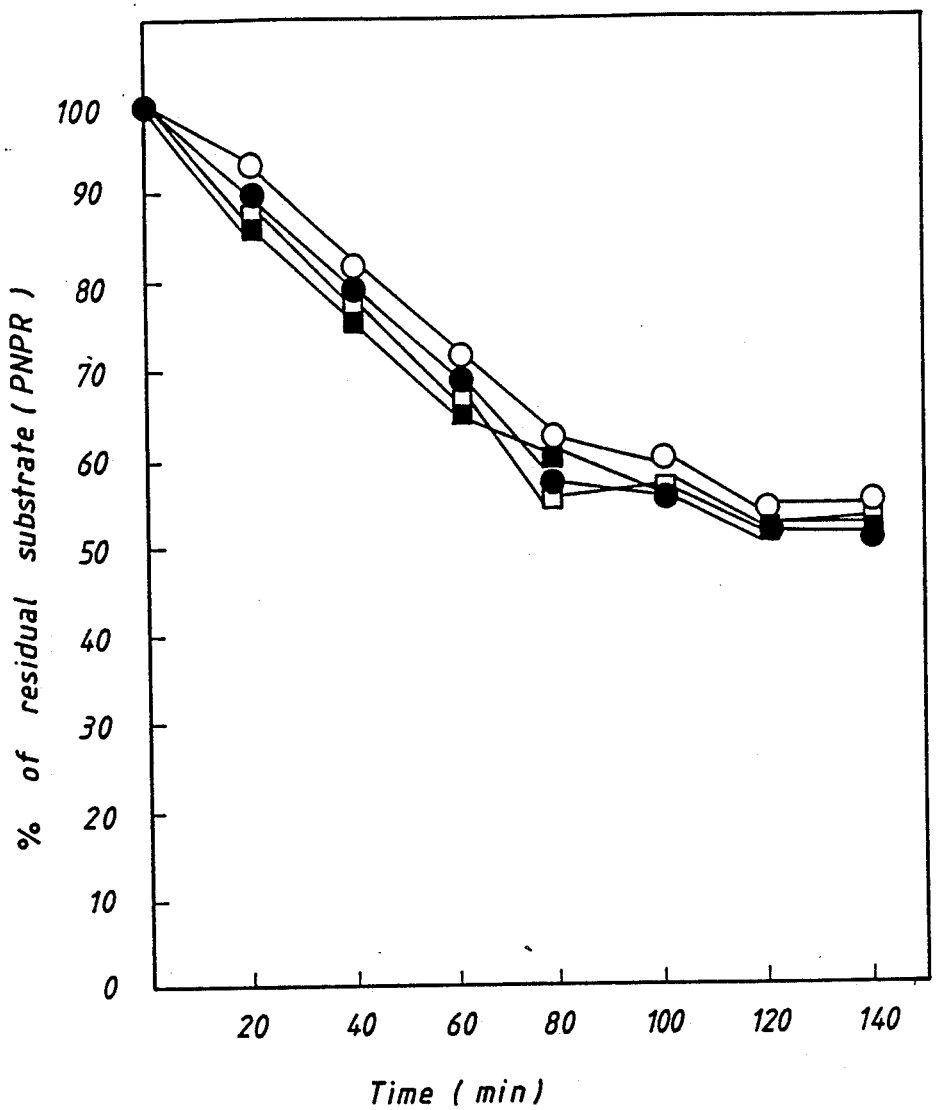
FIG. 1 illustrates the hydrolysis of PNPR in a buffer solution with 0.5 g of immobilized *Penicillium* sp. *naringinase*.

In accordance with the present invention, *Penicillium* sp. *naringinase* immobilized on cellulose triacetate can be used for fruit juice debittering. Not only are naringin and limonin simultaneously removed from fruit juices, but higher stabilities of enzyme columns during successive debittering are also obtained. When a fruit juice is recycled through an enzyme column in accordance with the present invention, column blocking or filtering action of the enzyme column is not observed.

The *Penicillium* sp. *naringinase* used in the present invention contains mainly $\alpha$-rhamnosidase and can be effectively used for the removal of naringin from fruit juices.

Since sugars such as glucose, fructose and rhamnose are competitive inhibitors for *Penicillium* sp. invention is very stable during successive debittering of fruit juices.

Limonin can be removed from fruit juices in accordance with the present invention by cellulose triacetate in view of adsorption effects.

The process of the present invention can be conducted in a column-type or centrifuge-type bio-reactor. In the process of the present invention, *Penicillium* sp. *naringinase* is first immobilized on cellulose triacetate. The immobilized enzyme is then packed in a bio-reactor. This is followed by passing a fruit juice to be debittered through the bio-reactor to obtain a juice in which naringin and limonin are simultaneously removed.

The *Penicillium* sp. *naringinase* can be immobilized on cellulose triacetate by general fiber entrapment methods; for example, the method disclosed by Mr. Dinelli D. in Process Biochem., 7, 9–12 (1972) and that by Mr. Morise et al in J. Dairy Sci. 56, 1123–1127 (1972).

The solvents suitable for use in the present invention to dissolve cellulose triacetate for immobilization are any of the solvents known to those skilled in enzyme immobilization, such as dichloromethane.

The ratio of cellulose triacetate to solvent and enzyme solution is about 1:13.4:1.3 (w:w:v).

The enzyme fibers are packed in the column-type bio-reactor in two ways. One way is that the enzyme fibers are cut into small pieces of about 1–2 cm in length and are irregularly packed into the column. The other is that the fibers, in the form of skeins, are arranged parallel to the long axis of a column and fixed at two extremes, as disclosed by Dinelli D. et al. in Methods in Enzymology, 44, 227–243 (1976). The enzyme fiber packing density is about 0.5–2.0 g of fibers per milliliter of column volume.

For debittering, a pump continuously recirculates a fixed amount of the juice to be debittered through a bio-reactor until the desired conversion is reached.

The naringin content in the reaction mixture of a fruit juice can be determined by, for example, the method described by Fischer and Wheaton in J. Agric. Food Chem., 24, 898–902 (1976). The limonin can be determined by, for example, the method described by Janes F. Fisher in J. Agric. Food Chem., 26, 497–499 (1978).

As to the naringinase activity, it is assayed by using p-nitrophenyl-α-L-rhamnoside (PNPR) as a substrate. The reaction progress is followed colormetrically by measuring the appearance of p-nitrophenol. Units of enzyme activity are expressed as umoles of p-nitrophenol (PNP) per min.

The invention is illustrated by the following examples. The examples are not intended to limit the broad scope of this invention.

EXAMPLE 1

To 13.44 ml of a dichloromethane solvent, 1 g of cellulose triacetate is added and dissolved by stirring. 200 units or 0.5 g naringinase from Penicillium sp. (Sigma Inc.) in 1.3 ml of a solution containing 10% glycerol is then added dropwise. The mixture is stirred at 400 rpm for twenty minutes. The resulting emulsion is maintained in a closed container and pressured with nitrogen gas and then poured into a spinneret with 18 pores, each pore being 0.075 mm in diameter. The spinneret is immersed in toluene. The threads drown from the spinneret are wound on a receiving roller and dried in vacuum. The immobilized enzyme is stored at 5° C. or room temperature for further use.

EXAMPLE 2

A column-type bio-reactor containing a water-jacketed glass column (8 mm i.d.), a peristaltic pump, a water bath and a reservoir for PNPR or naringin in a simulated juice system or grapefruit juice is used. 0.5 g of the immobilized enzyme fibers prepared in Example 1 are cut into 1–2 cm length and randomly packed in the bio-reactor. 30 ml of a substrate solution containing 2.85 mM PNPR in 0.1M sodium acetate buffer (pH 3.7) is continuously recycled from bottom to top through the column. The flow rate is kept at 1 ml per min. The operation is conducted at room temperature for 140 min. and repeated four times, one time each day. 50 μl of the reaction solution is taken for the measurement of p-nitrophenol content at intervals of 20 min. After each operation, the column is washed with 90 ml of 0.1M NaOAc, pH 3.7. The results are shown in FIG. 1. The enzyme is not inactivated. About 50% of PNPR is hydrolyzed within 80 min.

EXAMPLE 3

Figure 2:
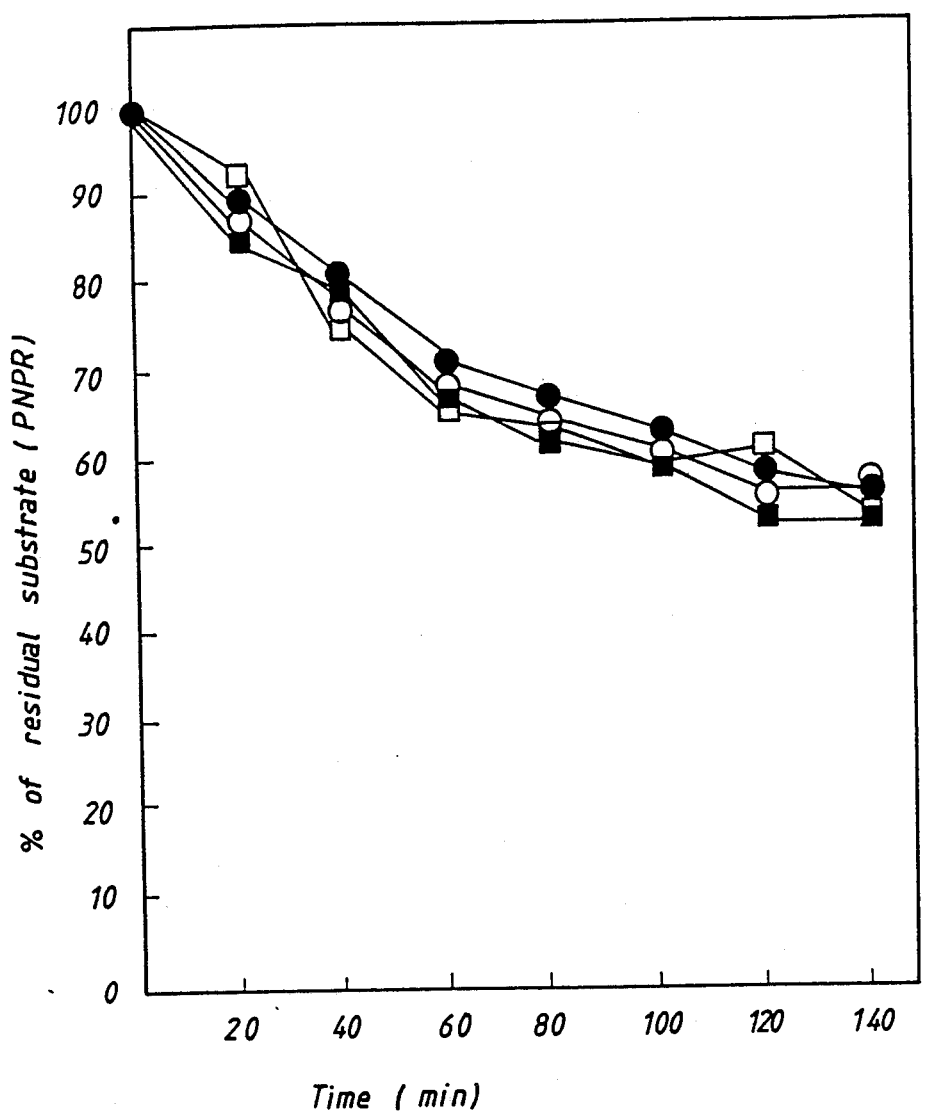
FIG. 2 illustrates the hydrolysis of PNPR in a simulated juice system with 0.5 g of immobilized *Penicillium* sp. *naringinase*.

The procedure of Example 2 is followed except that a simulated juice system which contains 2.85 mM PNPR, 5% sucrose, 3.5% glucose and 2.1% citric acid in 0.1M sodium acetate buffer (pH 3.7) is used. The results are shown in FIG. 2.

The immobilized enzyme fibers are not inactiviated at all after the PNPR solutions are continuously hydrolyzed with the same enzyme column in a total of 4 runs in 4 days.

EXAMPLE 4

Figure 3:
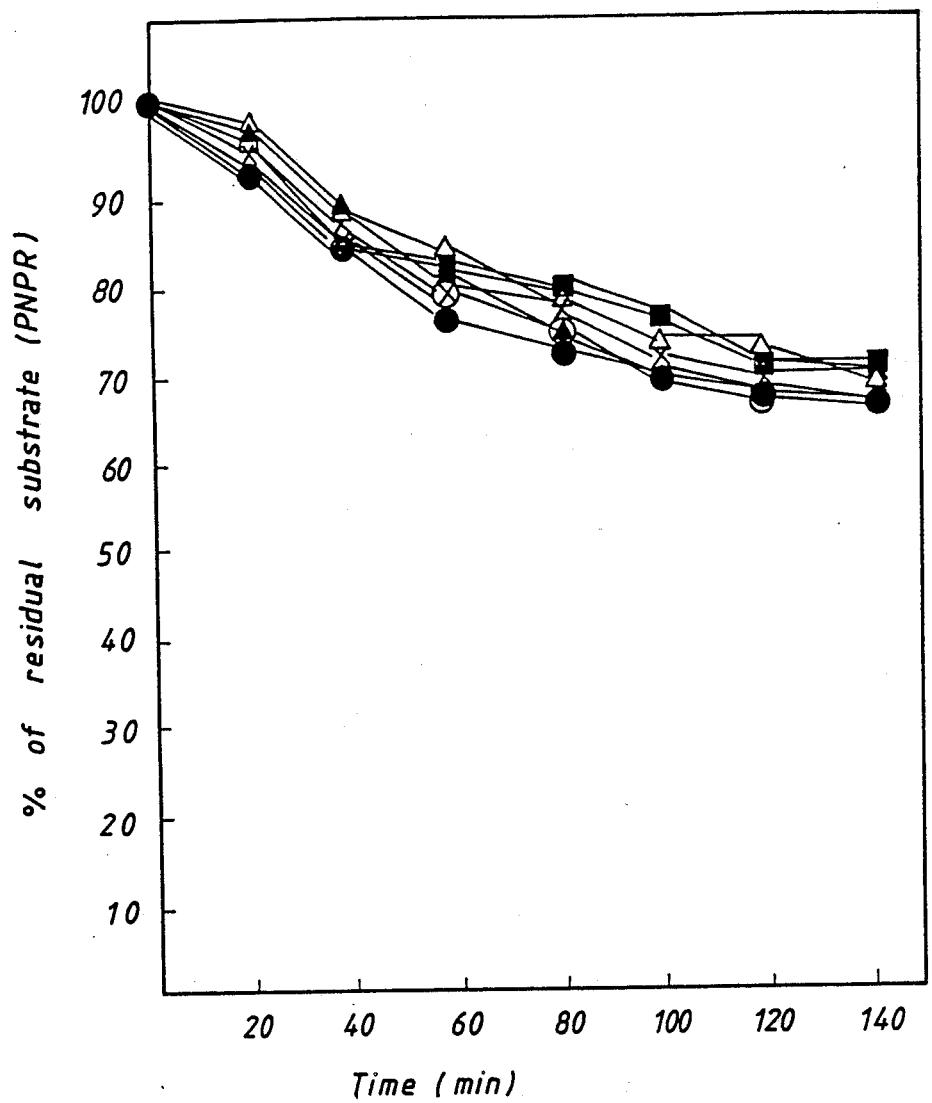
FIG. 3 illustrates the hydrolysis of PNPR in a grapefruit juice with 0.5 g of immobilized *Penicillium* sp. *naringinase*.

The procedure of Example 2 is followed except that a grapefruit juice containing 2.85 mM PNPR are used and the operation is repeated seven times. The results are shown in FIG. 3.

The stability of the enzyme column is not affected at all after PNPR in grapefruit juice is hydrolyzed by the same column seven times.

EXAMPLE 5

Figure 4:
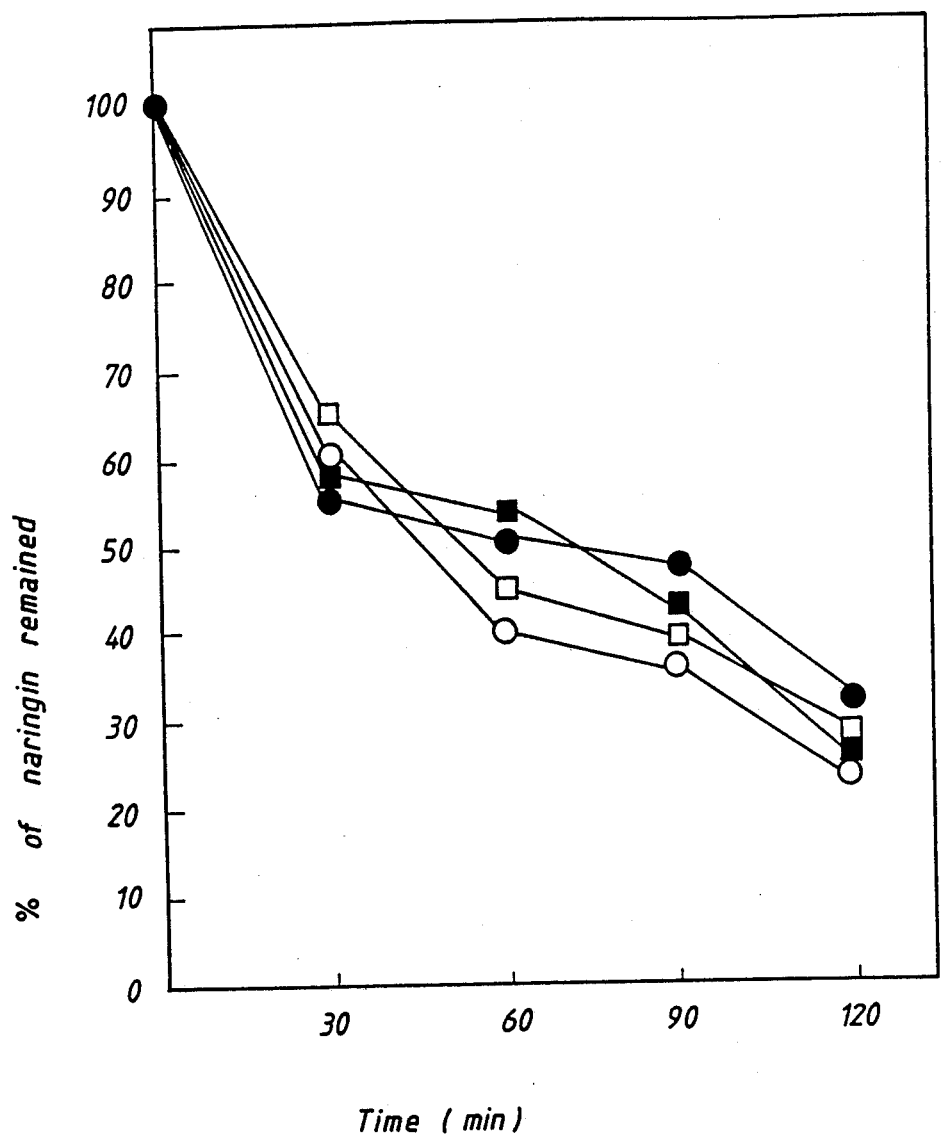
FIG. 4 illustrates the hydrolysis of naringin in a natural grapefruit juice with 1.0 g of immobilized *Penicillium* sp. *naringinase*.

The procedure of Example 4 is followed except that 1.0 g of the immobilized enzyme fibers and a natural grapefruit juice is used. The flow rate is kept at 0.5 ml per min. and the operation is conducted for 120 min. 10 ul of the reaction solution is taken for the measurement of naringin content by HPLC at intervals of 30 min. The results are shown in FIG. 4.

EXAMPLE 6

Figure 5:
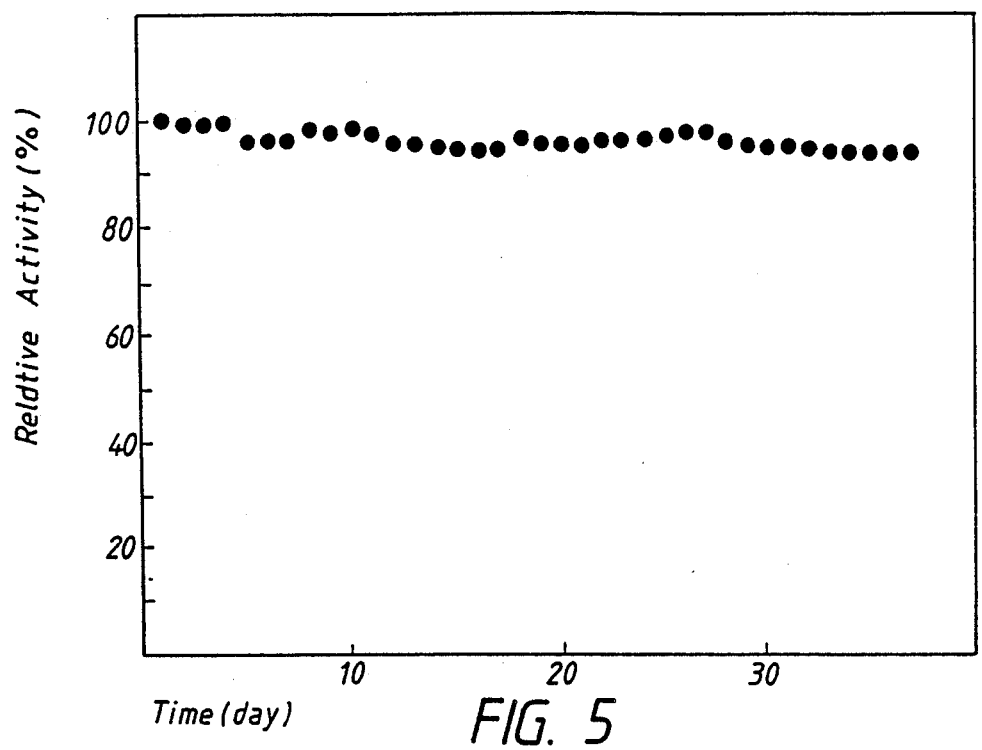
FIG. 5 illustrates the stability of a column-type bioreactor for Naringin hydrolysis.

30 ml of a grapefruit juice containing 2.85 mM NPR is continuously recycled through a column-type bio-reactor as the same one used in Example 2, under 1.0 ml/min. flow rate. THe operation is conducted for 2 hours and repeated thirty-seven times, one time each day. For each operation, at intervals of 20 min., 0.25 ml of the reaction solution is taken for the measurement of the p-nitrophenol formed and then the relative activity (%) of naringinase is determined on the basis of the naringinase activity measured in the first operation. After each operation, the column is washed with 300 ml of dilute water for one hour, under 4.0 ml/min. flow rate and then with 30 ml of 0.1M NaOAc buffer (pH 3.7) for 10 min. under the same flow rate. The results are shown in FIG. 5.

EXAMPLE 7

30 ml of a commercial grapefruit juice (Del Monte, Calif., USA) without any further clarification is continuously recycled through the same bio-reactor used in Example 2 for 2 hours with a pump, at a flow rate of 1.0 ml/min. The brix, insoluble solid content and turbidity of the fruit juice before and after recycling are then measured. After each operation, the enzyme column is washed with 150–250 ml of 0.1M sodium acetate buffer and left until the next operation. The operation is repeated five times. No clogging occurs. The brix is measured with a hand refractometer and the insoluble solid content is determined by the AOAC method disclosed by Williams S. in Official Method of Analysis, 14ed., 416–418 (1984). The turbidity of the fruit juice is determined after dilution with 20 folds of distilled water and by the NTU reading using a standardized ratio turbidimeter (Model 18900, HACH Co.). The results are shown in Table I.

EXAMPLE 8

The procedure of Example 7 is followed except that 30 ml of a self-prepared grapefruit juice is used. The results are shown in Table I.

EXAMPLE 9

The procedure of Example 7 is followed except that 0.5 g of the immobilized enzyme fibers prepared in Example 1, in the form of skeins, are arranged parallel to the long axis of a column-type bio-reactor. The results are shown in Table I.

EXAMPLE 10

The procedure of Example 8 is followed except that 0.5 g of the immobilized enzyme fibers prepared in Example 1, in the form of skeins, are arranged parallel to the long axis of a column-type bio-reactor. The results are shown in Table I.

EXAMPLE 11

30 ml of a commercial grapefruit juice the same as the one used in Example 7 is centrifuged at a high speed (36000×g) for 30 min. for clarification. After centrifugation, the brix and turbidity of the fruit juice are determined. The results are shown in Table I.

EXAMPLE 12

The procedure of Example 11 is followed except that 30 ml of a self-prepared grapefruit juice is used. The results are shown in Table I.

TABLE I

Effect of enzyme fibers in column-type reactors on the brix, insoluble solid content and turbidity of grapefruit juices

| Ex. No. | Run No. | Brix | Insoluble solid (mg/10 ml) | Turbidity (NTU) |
|---|---|---|---|---|
| 7 | 0 | 9.4 | 45–49 | 84 |
|   | 1 | 9.4 | 45 | 75 |
|   | 2 | 9.4 | 41 | 72 |
|   | 3 | 9.4 | 44 | 74 |
|   | 4 | 9.4 | 44 | 73 |
|   | 5 | 9.4 | 39 | 70 |
| 8 | 0 | 10.2 | 25–29 | 14.5 |
|   | 1 | 10.2 | 25 | 13.5 |
|   | 2 | 10.2 | 27 | 14.2 |
|   | 3 | 10.2 | 28 | 14.3 |
|   | 4 | 10.2 | 27 | 13.9 |
|   | 5 | 10.2 | 28 | 14.0 |
| 9 | 0 | 9.4 | 45–49 | 84 |
|   | 1 | 9.4 | 45 | 80 |
|   | 2 | 9.4 | 39 | 81 |
|   | 3 | 9.4 | 37 | 79 |
|   | 4 | 9.4 | 50 | 84 |
|   | 5 | 9.4 | 42 | 82 |
| 10 | 0 | 10.2 | 25–29 | 14.5 |
|   | 1 | 10.2 | 26 | 14.0 |
|   | 2 | 10.2 | 29 | 14.3 |
|   | 3 | 10.2 | 26 | 14.3 |
|   | 4 | 10.2 | 27 | 14.2 |
|   | 5 | 10.2 | 29 | 14.1 |
| 11 |   | 9.4 | n.d. | 12.4 |
| 12 |   | 10.2 | n.d. | 2.1 |

*n.d.: not determined

EXAMPLE 13

Figure 6:
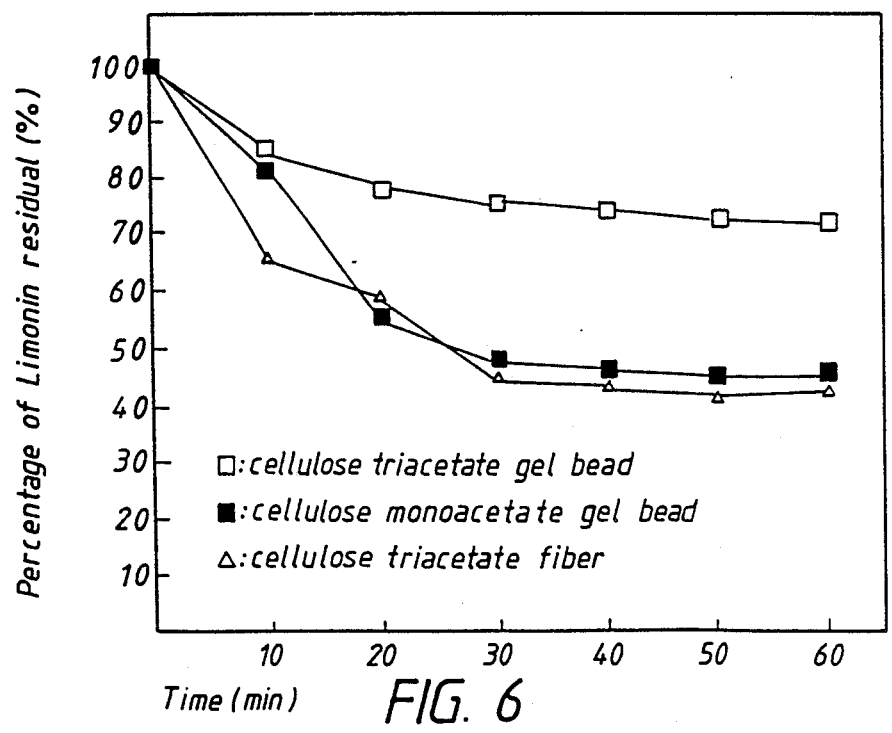
FIG. 6 illustrates the adsorption of limonin by different cellulose-based materials.

0.5 g of cellulose triacetate fibers having an average size of 0.08 mm (diameter)×3 cm are randomly packed in a column-type bio-reactor (0.8×10 cm). 30 ml of a solution containing 10 ppm limonin in 0.1M NaOAc buffer (pH 3.7) is continuously recycled from bottom to top through the reactor. The flow rate is kept at 1.0 ml/min. The operation is conducted for 60 min. and at intervals of 10 min., 0.25 ml of the reaction solution is taken for the measurement of residual limonin content. The results are shown in FIG. 6.

EXAMPLE 14

The procedure of Example 13 is followed except that 0.5 g of a commercial cellulose monoacetate gel bead having an average size of 0.37×0.28×0.27 (cm) is used. The results are shown in FIG. 6.

EXAMPLE 15

The procedure of Example 13 is followed except that 0.5 g of cellulose triacetate gel bead having an average size of 0.11 cm (diameter)×0.68 cm is used. The results are shown in FIG. 6.

EXAMPLE 16

Figure 7:
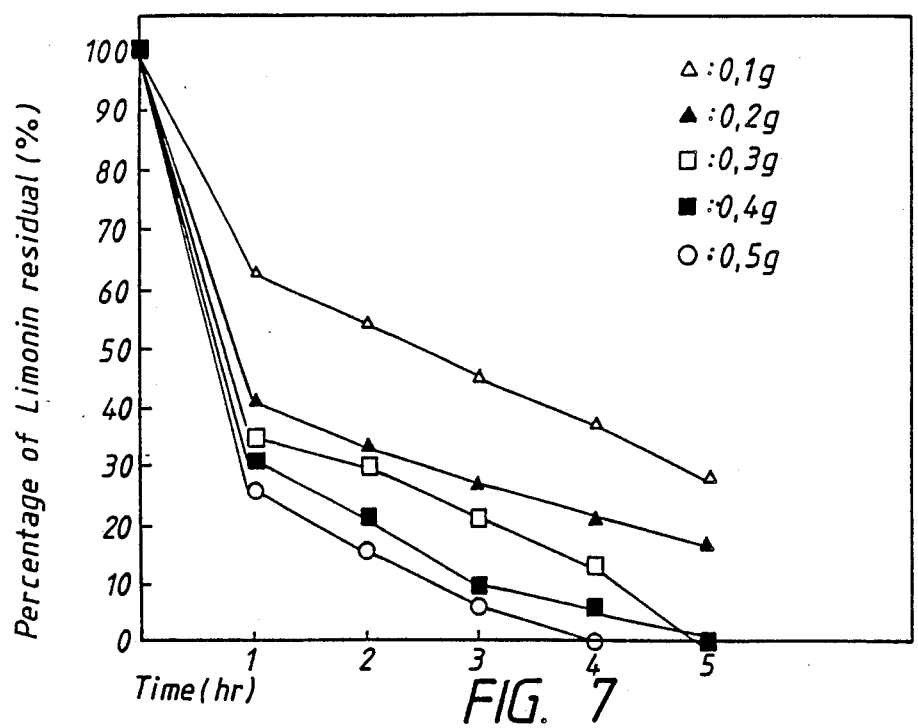
FIG. 7 illustrates the adsorption of limonin with various amounts of immobilized *Penicillium* sp. *naringianse*.

0.1 g of the immobilized enzyme fibers prepared in Example 1 are randomly packed in a column-type bio-reactor (0.8×10 cm). 12 ml of a solution containing 10 ppm limonin in 0.1M NaOAc buffer (pH 3.7) is continuously recycled from bottom to top through the column. The flow rate is kept at 1.0 ml/min. The operation is conducted for five hours and at intervals of one hour, 0.25 ml of the reaction solution is taken for the measurement of residual limonin content. The results are shown in FIG. 7.

EXAMPLE 17

The procedure of Example 16 is followed except that 0.2 g of the immobilized enzyme fibers are used. The results are shown in FIG. 7.

EXAMPLE 18

The procedure of Example 16 is followed except that 0.3 g of the immobilized enzyme fibers are used. The results are shown in FIG. 7.

EXAMPLE 19

The procedure of Example 16 is followed except that 0.4 g of the immobilized enzyme fibers are used. The results are shown in FIG. 7.

EXAMPLE 20

The procedure of Example 16 is followed except that 0.5 g of the immobilized enzyme fibers are used. The results are shown in FIG. 7.

EXAMPLE 21

0.5 g of the immobilized enzyme fibers prepared in Example 1 are cut into 1–2 cm length and randomly packed in a column-type reactor (0.8×10 cm). 30 ml of a solution containing 10 ppm limonin in 0.1M sodium acetate buffer (pH 3.7) is continuously recycled from bottom to top through the column. The flow rate is kept at 1.0 ml per min. The operation is conducted at room temperature for 80 min. and repeated five times. After each operation, 0.25 ml of the reaction solution is taken for the measurement of limonin content and the column is washed with 90 ml of 0.1M sodium acetate buffer. Besides, the first order rate of limonin removal is calculated in accordance with the following formula:

first order rate = (limonin or (naringin) removed content in the first ten min.)/initial limonin (or naringin) content/10 min.

All the results are shown in Table II.

EXAMPLE 22

The procedure of Example 21 is followed except that 30 ml of a solution containing 10 ppm limonin in 0.1M sodium acetate buffer containing 1.4% citric acid, 2% glucose, 3% fructose and 6% sucrcose (pH 3.7) is used. The results are shown in Table II.

EXAMPLE 23

The procedure of Example 21 is followed except that 30 ml of a solution containing 10 ppm limonin in 0.1M sodium acetate buffer containing 1.7% citric acid, 3% glucose, 2% fructose and 6% surcose (pH 3.1) is used. The results are shown in Table II.

EXAMPLE 24

The procedure of Example 21 is followed except that 30 ml of a natural grapefruit juice containing 9.4 ppm limonin is used. The results are shown in Table II.

TABLE II

| Removal of limonin in buffer and grapefruit juice systems with column-type reactor | | | |
|---|---|---|---|
| Limonin removed (%) | | | |
| Ex. 21 | Ex. 22 | Ex. 23 | Ex. 24 |
| 1. 56% (4.0%) | 54% (2.5%) | 53% (2.8%) | 58% (1.2%) |
| 2. 55% (3.9%) | 52% (2.4%) | 52% (2.9%) | 58% (0.9%) |
| 3. 55% (3.6%) | 55% (2.8%) | 49% (2.7%) | 52% (1.2%) |
| 4. 58% (3.8%) | 54% (2.8%) | 53% (2.5%) | 55% (0.8%) |
| 5. 54% (3.5%) | 53% (3.0%) | 54% (2.7%) | 56% (1.3%) |

**Data in parenthesis represent the first order rate of limonin removed.

EXAMPLE 25

Figure 8:
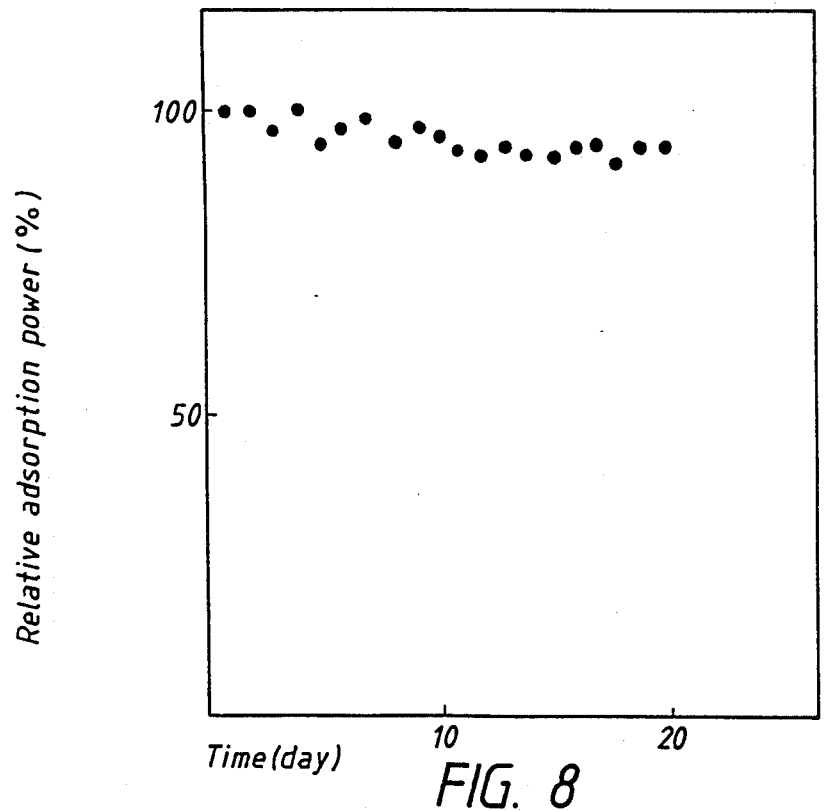
FIG. 8 illustrates the stability of a column-type bioreactor for limonin adsorption.

30 ml of a solution containing 10 ppm limonin in 0.1M NaOAc (pH 3.7) is continuously recycled through a column-type bio-reactor as the same one used in Example 2, under 1.0 ml/min flow rate. The operation is conducted for 2 hours and repeated twenty times, one time each day. 0.25 ml of the reaction solution is taken for the measurement of limonin content and then the relative adsorption power (%) is determined on the basis of the residual limonin content left in first operation. After each operation, the column is washed with 300 ml of dilute water for one hour, under 4.0 ml/min. flow rate and then with 30 ml 0.1M NaOAc (pH 3.7) for 10 min, under the same flow rate. The results are shown in FIG. 8.

EXAMPLE 26

The procedure of Example 21 is followed except that the immobilized enzyme fibers are packed in a centrifuge-type reactor (3.5×8 cm). The stirring speed is kept at 100 rpm and the operation time is 60 min. The results are shown in Table III.

EXAMPLE 27

The procedure of Example 22 is followed except that the immobilized enzyme fibers are packed in a centrifuge-type reactor (3.5×8 cm). The stirring speed is kept at 100 rpm and the operation time is 60 min. The results are shown in Table III.

EXAMPLE 28

The procedure of Example 23 is followed except that the immobilized enzyme fibers are packed in a centrifuge-type reactor (3.5×8 cm). The stirring speed is kept at 100 rpm and the operation time is 60 min. The results are shown in Table III.

EXAMPLE 29

The procedure of Example 24 is followed except that the immobilized enzyme fibers are packed in a centrifuge-type reactor (3.5×8 cm). The stirring speed is kept at 100 rpm and the operation time is 60 min. The results are shown in Table III.

TABLE III

| Removal of limonin in buffer and grapefruit juice systems with centrifuge-type reactor | | | |
|---|---|---|---|
| Limonin removed (%) | | | |
| Ex. 26 | Ex. 27 | Ex. 28 | Ex. 29 |
| 1. 56% (3.1%) | 52% (2.3%) | 56% (2.1%) | 58% (1.0%) |
| 2. 59% (3.1%) | 56% (2.6%) | 58% (2.2%) | 57% (1.1%) |
| 3. 54% (2.5%) | 50% (2.8%) | 53% (2.0%) | 55% (1.2%) |
| 4. 57% (3.4%) | 52% (2.3%) | 49% (2.4%) | 55% (1.2%) |
| 5. 57% (3.5%) | 55% (2.2%) | 54% (2.3%) | 53% (1.2%) |

EXAMPLE 30

0.5 g of the immobilized enzyme fibers prepared in Example 1 are cut into 1–2 cm length and packed into the same column-type bio-reactor used in Example 2. 30 ml of a juice solution is continuously recycled from bottom to top through the column. The flow rate is kept at 1.0 ml per min. The operation is conducted for 140 min. and repeated five times. 0.25 ml of the reaction solution is taken for the measurements of the contents of naringin and limonin contents respectively. Besides, the first order rates of naringin and limonin are also calculated using the formula indicated in Example 10 respectively. The results are shown in Table IV.

EXAMPLE 31

The procedure of Example 30 is followed except that the immobilized enzyme fibers are packed in a centrifuge-type reactor (3.5×8 cm) and the stirring speed is kept at 100 rpm. The operation is conducted for 60 min. The results are shown in Table IV.

TABLE IV

Removal of Naringin and limonin from grapefruit juice with a column- or centrifugate-type reactor

| | Ex. 30 | | | | Ex. 31 | | | |
|---|---|---|---|---|---|---|---|---|
| | Naringin | | Limonin | | Naringin | | Limonin | |
| Run | Extent | Rate | Extent | Rate | Extent | Rate | Extent | Rate |
| 1. | 31% | 0.5% | 58% | 1.2% | 33% | 0.8% | 58% | 1.0% |
| 2. | 35% | 0.5% | 58% | 0.9% | 35% | 1.4% | 57% | 1.1% |
| 3. | 32% | 0.4% | 52% | 1.2% | 32% | 1.2% | 54% | 1.3% |
| 4. | 31% | 0.8% | 55% | 0.8% | 36% | 1.0% | 55% | 1.2% |
| 5. | 34% | 0.5% | 56% | 1.3% | 34% | 0.8% | 53% | 1.2% |

EXAMPLE 32

30 ml of a natural grapefruit juice is recycled through a centrifuge-type reactor packed with 0.5 g of the immobilized enzyme fibers prepared in Example 1 (3.5×8 cm) for 60 min. and the stirring speed is kept at 100 rpm. After the operation, the limonin and maringin contents, bitterness, flavour and acceptability of the reaction solution are determined. The results are shown in Table V.

COMPARATIVE EXAMPLE

The limonin and naringin contents, bitterness, flavour and acceptability of 30 ml of a natural grapefruit juice are determined. The results are also shown in Table V.

The removal of limonin and naringin from the natural grapefruit juice by the reactor packed with the immobilized enzyme fibers of the present invention does not affect the flavour and acceptability of the juice and except the bitterness, the immobilized enzyme fibers do not remove the major flavor compound from the juice.

TABLE V

Comparison of the grapefruit juices with or without the treatment of the immobilized enzyme fibers of the present invention

| | | | Mean panel scores** | | |
|---|---|---|---|---|---|
| Juice | Limonin (ppm) | Naringin (ppm) | Bitterness | Flavour | Acceptability |
| Example 32 | 4.5 | 240 | 4.0 | 3.33 | 3.5 |
| Comparative Example | 9.8 | 375 | 3.3 | 3.16 | 3.26 |

**Scoring is based on a five-point hedonic scale ranging from 5 point (the most favorable for general flavour and acceptability) to 1 point (the least favorable for general flavour and acceptability).

Although the invention has been illustrated by the preceding examples, it is not to be constrained as being limited to the materials and the size of the reactor employed therein, but rather, the invention relates to the generic area as hereinbefore disclosed. Various modifications and embodiments thereof can be made without departing from the spirit and scope thereof.

I claim:

1. A process for simultaneous removal of naringin and limonin from a fruit juice comprising the following step:
   continuously contacting naringinase derived from Peniccillium sp. which is immobilized on cellulose triacetate in a bio-reactor, with the fruit juice.
2. A process according to claim 1, wherein the fruit juice is a citrus juice.
3. A process according to claim 1, wherein the bio-reactor is a column-type bio-reactor.
4. A process according to claim 1, wherein the bio-reactor is a centrifuge-type bio-reactor.
5. A process according to claim 3, wherein the naringinase immobilized on cellulose triacetate is irregularly packed into the column-type bio-reactor.
6. A process according to claim 3, wherein the naringinase immobilized on cellulose triacetate is, in the form of skeins, arranged parallel to a long axis of the column-type bio-reactor.

* * * * *